(12) United States Patent
Jarng

(10) Patent No.: US 12,143,898 B2
(45) Date of Patent: Nov. 12, 2024

(54) DIGITAL RADIO SYSTEM BASED ON MOBILE TERMINAL

(71) Applicant: ALGORKOREA CO. LTD., Seoul (KR)

(72) Inventor: Soon Suck Jarng, Seoul (KR)

(73) Assignee: ALGORKOREA CO. LTD., Seoul (KR)

( * ) Notice: Subject to any disclaimer, the term of this patent is extended or adjusted under 35 U.S.C. 154(b) by 336 days.

(21) Appl. No.: 17/642,338

(22) PCT Filed: Sep. 11, 2019

(86) PCT No.: PCT/KR2019/011787
§ 371 (c)(1),
(2) Date: Mar. 11, 2022

(87) PCT Pub. No.: WO2021/049683
PCT Pub. Date: Mar. 18, 2021

(65) Prior Publication Data
US 2022/0303731 A1    Sep. 22, 2022

(51) Int. Cl.
*H04M 1/00*    (2006.01)
*H04B 1/52*    (2015.01)
(Continued)

(52) U.S. Cl.
CPC ............... *H04W 4/06* (2013.01); *H04B 1/52* (2013.01); *H04W 72/0453* (2013.01);
(Continued)

(58) Field of Classification Search
CPC .......................... H04M 1/72403; H04W 4/06
See application file for complete search history.

(56) References Cited

U.S. PATENT DOCUMENTS

| | | |
|---|---|---|
| 8,253,684 B1 | 8/2012 | Lloyd |
| 2012/0243691 A1* | 9/2012 | Lin .......................... H04R 5/04 |
| | | 381/22 |

(Continued)

FOREIGN PATENT DOCUMENTS

| | | |
|---|---|---|
| KR | 10-2005-0039434 A | 4/2005 |
| KR | 10-2007-0075434 A | 7/2007 |

(Continued)

OTHER PUBLICATIONS

International Search Report for PCT/KR2019/011787 mailed on Jun. 11, 2020.

*Primary Examiner* — Shantell L Heiber
(74) *Attorney, Agent, or Firm* — The PL Law Group, PLLC

(57) ABSTRACT

A digital radio system based on a mobile terminal according to an embodiment of the present disclosure includes: an analog radio transceiver configured to, while changing a used frequency band at any time, communicate with another analog radio transceiver through the used frequency band, and the mobile terminal configured to allow connection of the analog radio transceiver, and then decode a signal received through the analog radio transceiver and reconstruct and reproduce at least one of audio data, image data, and metadata, or encode at least one audio data, image data, and metadata generated by a user and wirelessly transmit the encoded data through the analog radio transceiver.

5 Claims, 5 Drawing Sheets

(51) Int. Cl.
*H04W 4/06* (2009.01)
*H04W 72/0453* (2023.01)
*H04W 72/20* (2023.01)
*H04W 88/02* (2009.01)
*H04W 88/08* (2009.01)
*H04W 92/18* (2009.01)

(52) U.S. Cl.
CPC ............ *H04W 72/20* (2023.01); *H04W 88/02* (2013.01); *H04W 88/08* (2013.01); *H04W 92/18* (2013.01)

(56) References Cited

U.S. PATENT DOCUMENTS

2016/0191593 A1* 6/2016 Xiao ..................... H04L 67/303
370/261
2017/0302342 A1* 10/2017 Kurchuk ................ H04B 1/405

FOREIGN PATENT DOCUMENTS

| KR | 10-2017-0142301 A | 12/2017 |
| KR | 10-1979648 B1 | 5/2019 |
| KR | 10-1970225 B1 | 8/2019 |

* cited by examiner

DIGITAL RADIO SYSTEM BASED ON MOBILE TERMINAL

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2019/011787, filed Sep. 11, 2019, the entire contents of which are incorporated herein by reference.

BACKGROUND

1. Technical Field

The present disclosure relates to a digital radio system based on a mobile terminal, and more particularly, to a digital radio system based on a mobile terminal which may perform a digital radio function by combining an analog radio transceiver with a mobile terminal.

2. Background Art

Radio transceivers are devices that allow multiple users to communicate through a specific frequency channel. Because radio transceivers do not require a separate base station, the demand for the radio transceivers continues to grow in remote areas, mountainous areas, or disaster relief, security, and military applications where public telephone networks or Internet networks are scarce.

Conventional radio transceivers are mainly driven by using an analog method, but the conventional radio transceivers are noisy and thus are not easy to use. Accordingly, digital radio transceivers have recently begun to emerge. Digital radio transceivers are able to transmit not only sound but also text, emergency news subtitles, slides, and photos.

However, because digital radio transceivers perform encoding of compressing sound, text, and data for signal transmission and reception and then transmit the sound, text, and data through radio frequency (RF) waves, decoding for reconstructing encoded received signals as well as encoding is essential for the digital radio transceivers. That is, digital radio transceivers must be able to simultaneously perform encoding and decoding required for signal compression and reconstruction.

Accordingly, a digital radio function may not be provided by using a conventional analog radio transceiver, and to this end, an expensive digital radio transceiver including a digital processor device should be separately purchased and used.

A mobile terminal such as a smartphone or a tablet personal computer (PC) includes all elements required for a digital radio function, including an encoder and a decoder for transmitting and receiving a digital signal, and an application chip including a central processing unit (CPU) and a graphics processing unit (GPU).

SUMMARY

In order to solve the problems, the present disclosure provides a digital radio system based on a mobile terminal which may perform a digital radio function by combining an analog radio transceiver with a mobile terminal.

The present disclosure also provides a digital radio system based on a mobile terminal which may further maximize the utilization of a radio transceiver, by allowing radio content with the other party to be recorded and reproduced in units of files.

Objectives of the present disclosure are not limited thereto, and other unmentioned objectives will be clearly understood by one of ordinary skill in the art to which the present disclosure pertains from the following description.

According to the present disclosure, a digital radio function may be additionally provided through combination of an analog radio transceiver with a mobile terminal by enabling digital processing of a radio signal by using a mobile terminal resource. That is, without separately purchasing a digital radio transceiver, a digital radio function may be provided by installing and executing a radio transceiver application on a mobile terminal held by a user and then combining the radio transceiver application with an analog radio transceiver.

Also, a user may listen to necessary content anytime, anywhere and may use the necessary content more diversely, by allowing radio content to be recorded and reproduced in units of files.

DETAILED DESCRIPTION

Figure 1:
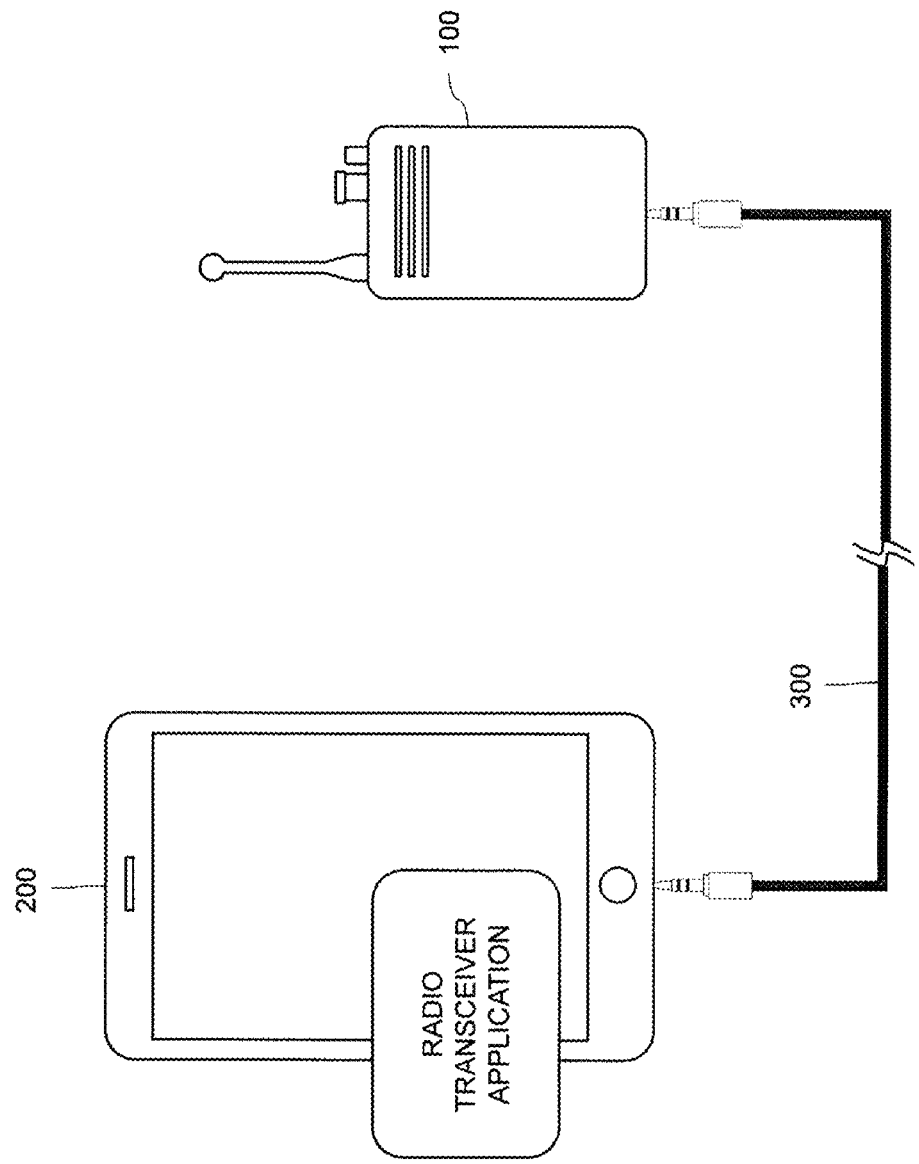
FIG. 1 is a view illustrating a digital radio system based on a mobile terminal according to an embodiment of the present disclosure.

According to an embodiment of the present disclosure, a digital radio system based on a mobile terminal includes: an analog radio transceiver configured to, while changing a used frequency band at any time, communicate with another analog radio transceiver through the used frequency band; and the mobile terminal configured to allow connection of the analog radio transceiver, and then decode a signal received through the analog radio transceiver and reconstruct and reproduce at least one of audio data, image data, and metadata, or encode at least one audio data, image data, and metadata generated by a user and wirelessly transmit the encoded data through the analog radio transceiver.

The mobile terminal may include: an external device connector configured to support connection and communication of the analog radio transceiver; a data input/output unit including at least one of a touchscreen, a speaker, a microphone, and a camera; and a radio transceiver application configured to decode an output signal of the analog radio transceiver, reconstruct the output signal into at least one of audio data, image data, and metadata, and then reproduce the reconstructed data through the data input/output unit, or encode at least one of audio data, image data, and metadata obtained through the data input/output unit and then transmit the encoded data to the analog radio transceiver through the external device connector.

The radio transceiver application may include: an input buffer configured to sequentially store output signals of the analog radio transceiver and then sequentially output the stored signals in units of frames; a decoder configured to decode an output signal of the input buffer; an encoder configured to encode at least one of audio data, image data, and metadata obtained through the data input/output unit; an output buffer configured to sequentially store output signals of the encoder and then sequentially output the stored signals to the external device connector in units of frames; and a controller configured to configure and provide a graphical user interface (GUI), and control an overall application operation according to a user control value input through the GUI.

The controller may further include, when radio content recording is requested, a function of recording both data reconstructed through the decoder and data input to the encoder in units of files and storing the data in a memory.

The controller may further include, when recording file search is requested, a function of guiding recording files stored in the memory, and then reading audio data, image data, and metadata of a user-selected file and reproducing the read data audiovisually through the data input/output unit.

The controller may further include a function of providing an emergency menu through the GUI, and when the emergency menu is selected by the user, occupying a used frequency in preference to another analog radio transceiver.

The controller may further include a function of pre-defining a user motion gesture corresponding to an emergency event while interoperating with a motion sensor built in the mobile terminal, and when a mobile terminal motion sensed through the motion sensor corresponds to the user motion gesture, occupying a used frequency in preference to another analog radio transceiver.

The following description illustrates only a principle of the present disclosure. Therefore, one of ordinary skill in the art may implement the principle of the present disclosure and invent various devices included in the spirit and scope of the present disclosure although not clearly described or shown in the present specification. In addition, it is to be understood that all conditional terms and embodiments mentioned in the present specification are basically intended only to allow one of ordinary skill in the art to understand a concept of the present disclosure, and the present disclosure is not limited to embodiments and states particularly mentioned as such.

Further, it is to be understood that all detailed descriptions mentioning a specific exemplary embodiment of the present disclosure as well as principles, aspects, and exemplary embodiments of the present disclosure are intended to include structural and functional equivalences thereof. Further, it is to be understood that these equivalences include an equivalence that will be developed in the future as well as an equivalence that is current well-known, that is, all devices invented so as to perform the same function regardless of a structure.

Therefore, it is to be understood that, for example, a block diagram of the present specification shows an illustrative conceptual aspect for embodying a principle of the present disclosure. Similarly, it is to be understood that all flowcharts, state transition diagrams, pseudo-code, and the like, show various processes that may be tangibly embodied in a computer-readable medium and that are executed by computers or processors regardless of whether or not the computers or the processors are clearly shown.

Functions of various devices including processors or functional blocks represented as concepts similar to the processors and shown in the accompanying drawings may be provided by hardware having capability to execute appropriate software as well as dedicated hardware. When the functions are provided by the processors, they may be provided by a single dedicated processor, a single shared processor, or a plurality of individual processors and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read-only memory (ROM), a random-access memory (RAM), and a non-volatile memory for storing software without being limited thereto. The above-mentioned terms may also include well-known other hardware.

In the claims of the present specification, components represented as means for performing functions mentioned in the detailed description are intended to include all methods for performing functions including all types of software including, for example, a combination of circuit devices performing these functions, firmware/micro code, or the like, and are coupled to appropriate circuits for executing the software so as to execute these functions. It is to be understood that because functions provided by variously mentioned means are combined with each other and are combined with a scheme demanded by the claims in the present disclosures defined by the claims, any means capable of providing these functions are equivalent to means recognized from the present specification.

The above-mentioned objects, features, and advantages will become more obvious from the following detailed description provided in relation to the accompanying drawings. Therefore, one of ordinary skill in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted.

FIG. 1 is a view illustrating a digital radio system based on a mobile terminal according to an embodiment of the present disclosure.

As shown in FIG. 1, a system of the present disclosure includes an analog radio transceiver 100, a mobile terminal 200 configured to support connection and communication of the analog radio transceiver 100, and an audio cable 300 configured to electrically connect an audio terminal of the analog radio transceiver 100 to an external device connector of the mobile terminal 200.

The analog radio transceiver 100 communicates with another analog radio transceiver while changing a used frequency band at any time. In a transmission mode (i.e., in a push-to-talk (PTT) button selected state), the analog radio transceiver 100 modulates a user's voice obtained through a microphone into an RF signal and wirelessly transmits the RF signal through a currently used frequency band, and in a reception mode (i.e., a PTT button unselected state), the analog radio transceiver 100 demodulates an RF signal wirelessly transmitted through the currently used frequency band and reproduces the demodulated RF signal through a speaker.

However, the analog radio transceiver 100 of the present disclosure may be connected to the mobile terminal through the audio cable 300 connected to the audio terminal, and in this case, the analog radio transceiver 100 performs a signal input/output operation through the audio terminal instead of the microphone and the speaker.

In this case, both terminals of the audio cable 300 may be variously modified according to implementation types of the audio terminal of the analog radio transceiver and the external device connector of the mobile terminal.

The mobile terminal 200 supports connection of the analog radio transceiver 100 and enables a radio transceiver application capable of encoding and decoding a signal transmitted and received through the analog radio transceiver 100 to be installed and executed.

That is, the radio transceiver application is additionally provided, and thus, a digital processing function of reconstructing and reproducing an output signal of the analog radio transceiver 100 into audio data, image data, and metadata, or encoding audio data, image data, and metadata generated by the user and providing the data to the analog radio transceiver 100 is performed.

As such, according to the present disclosure, because a digital processing function may be performed by using a resource of the mobile terminal 200, a digital radio function may be performed only by combining the analog radio transceiver 100 with the mobile terminal 200 without adding or changing a separate hardware device.

Figure 2:
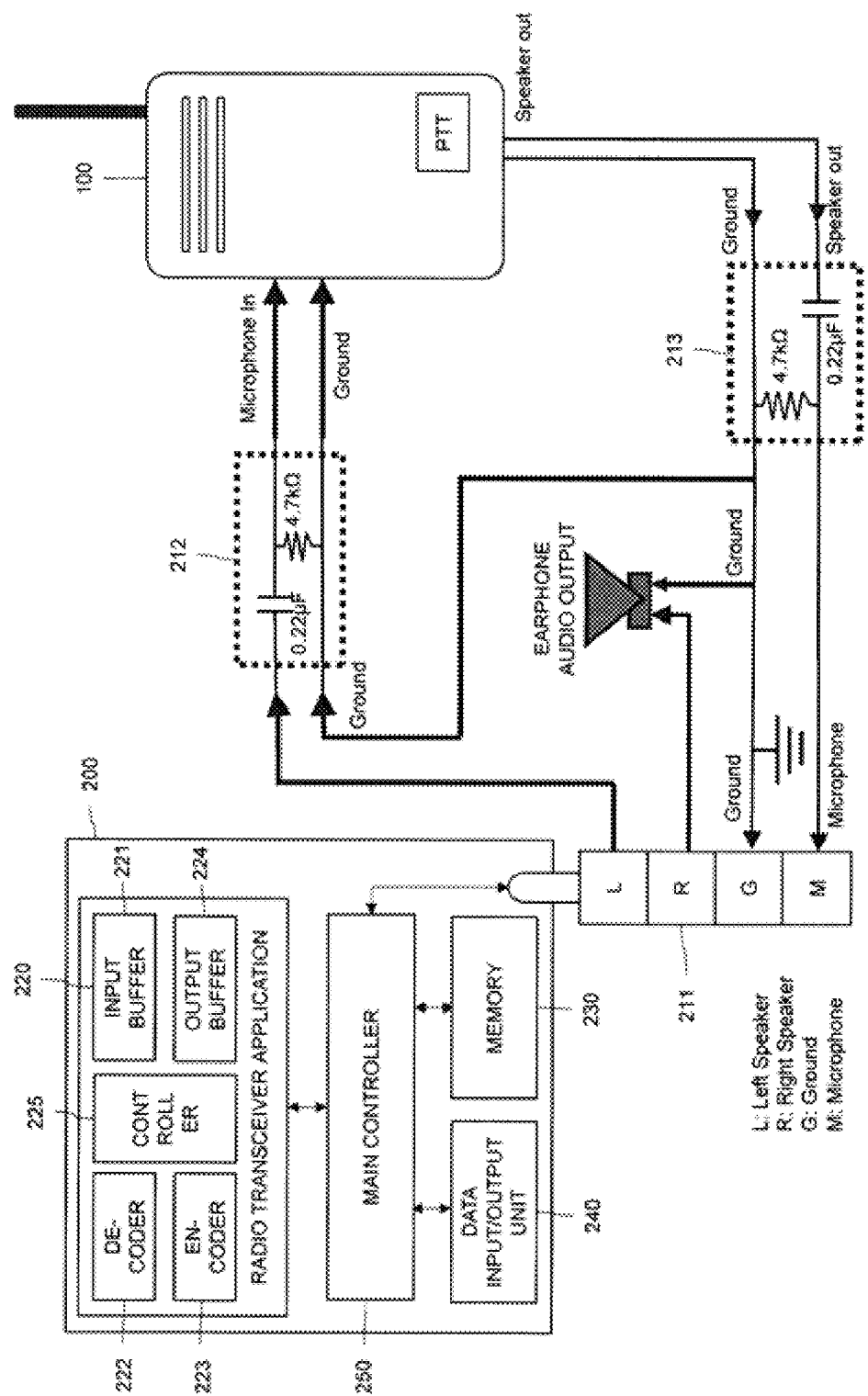
FIG. 2 is a diagram illustrating a detailed configuration of a mobile terminal according to an embodiment of the present disclosure.

FIG. 2 is a diagram illustrating a detailed configuration of a mobile terminal according to an embodiment of the present disclosure.

As shown in FIG. 2, the mobile terminal 200 of the present disclosure includes an external device connector 210, a radio transceiver application 220, a memory 230, a data input/output unit 240, and a main controller 250.

The external device connector 210 supports connection and communication of the analog radio transceiver 100. Although the external device connector 210 includes a 4-pole audio plug 211, a receiving high-pass filter 212, and a transmitting high-pass filter 213, the external device connector 210 may variously include a data terminal and a charging terminal when necessary.

The radio transceiver application 220 that is a program downloadable or installable through Apple App Store and Android Google Play Store may encode and decode a signal transmitted and received through the analog radio transceiver 100.

In more detail, the application 220 includes an input buffer 221 configured to sequentially store output signals of the analog radio transceiver 100 and then sequentially output the stored signals in units of frames, a decoder 222 configured to demodulate, synchronize, and decode a signal output from the input buffer 221 and reconstruct the signal into at least one of audio data, image data, and metadata, an encoder 223 configured to encode audio data, image data, and metadata obtained through the data input unit 240, compress the data in real time in units of frames, and then modulate, synchronize, and sequentially store the data in an output buffer 224, the output buffer 224 configured to sequentially store output signals of the encoder 223 and sequentially output the stored signals to the external device connector 210 in units of frames, and a controller 225 configured to configure and provide a graphical user interface (GUI) for driving an application and control an overall operation of the radio transceiver application 220 according to a user control value input through the GUI.

The controller 233 provides a file recording function and a file search function, so that a signal transmitted and received through the analog radio transceiver 100 is stored in the memory 230 in units of files, and a user searches for and views a necessary file in units of files later.

Also, the controller 233 of the present disclosure additionally provides an emergency menu through the GUI, and when the user selects the emergency menu, occupies a used frequency in preference to another analog radio transceiver 100. However, when the other analog radio transceiver is already driven in a transmission mode and occupies the used frequency, the controller 233 waits until the transmission mode of the other analog radio transceiver ends and then performs an operation of occupying the used frequency in preference.

In addition, the controller 233 of the present disclosure may pre-define a user motion gesture corresponding to an emergency event while interoperating with a motion sensor (e.g., an acceleration sensor, a gyro sensor, or a geomagnetic sensor) built in the mobile terminal 200. The controller 233 detects and analyzes, in real time, a three-dimensional (3D) motion of the mobile terminal 200 through the motion sensor, and when the user moves the mobile terminal 200 according to the pre-defined user motion gesture, immediately performs the operation of occupying the used frequency in preference.

That is, according to the present disclosure, through the user's simple operation of moving the mobile terminal 200 in a certain pattern instead of an operation of manipulating a GUI menu, the operation of occupying the used frequency in preference may be performed. In this case, examples of the motion gesture may include a gesture of continuously shaking the mobile terminal 200 up and down or left and right two or more times and a gesture of continuously tapping the mobile terminal 200 with a finger three or more times, and various modifications may be made later.

The main controller 250 controls an overall operation of the mobile terminal at the user's request. In particular, only when the analog radio transceiver 100 is connected through the external device connector 210, the radio transceiver application 220 may be driven. Accordingly, when the user selects and drives the radio transceiver application 220, the main controller 250 reproduces audio data, image data, and metadata reconstructed through the radio transceiver application 220 audiovisually through the input/output unit 240, or provides audio data, image data, and metadata input through the data input/output unit 240 to the radio transceiver application 220.

The data input/output unit 240 includes a touchscreen, a speaker, a microphone, and/or a camera, and audiovisually reproduces or receives various information under the control of the main controller 250.

Figure 3:
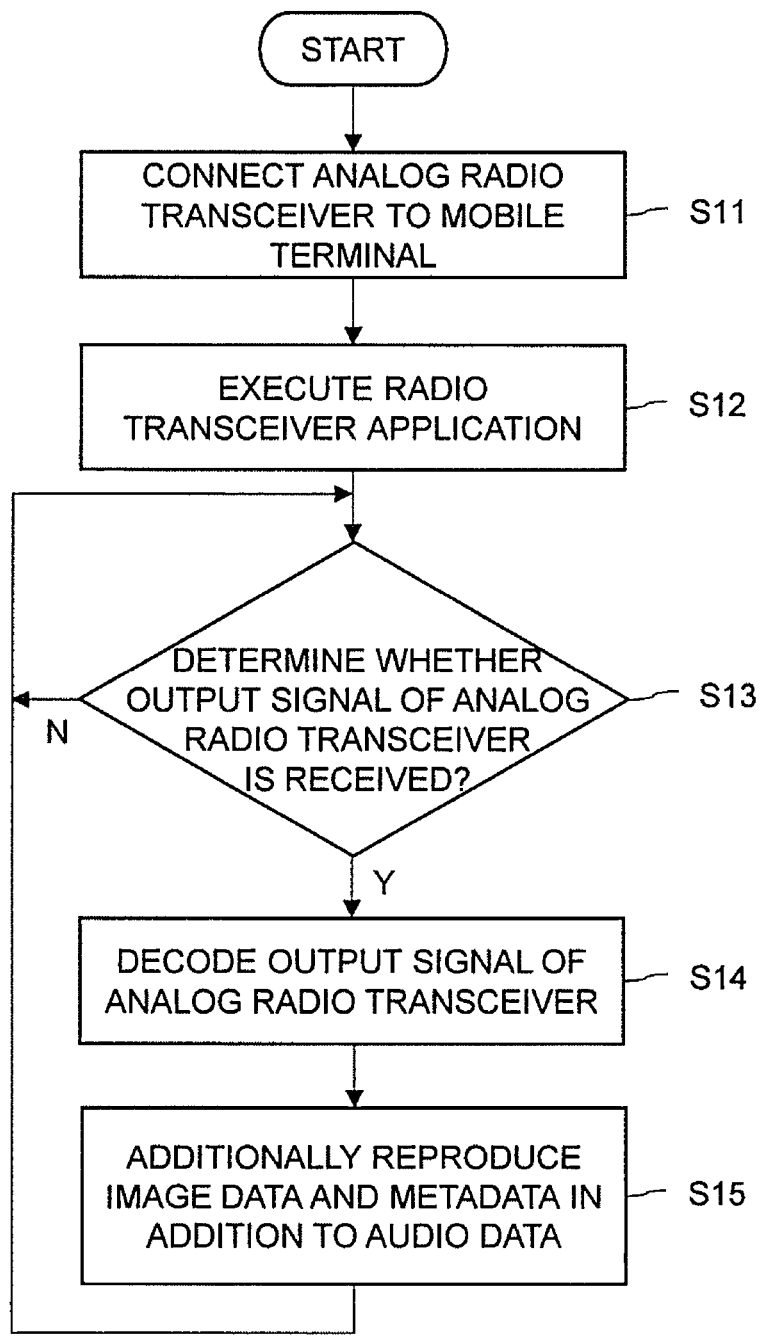
FIGS. 3 through 5 are diagrams for describing an operating method of a radio transceiver application according to an embodiment of the present disclosure.
Figure 4:
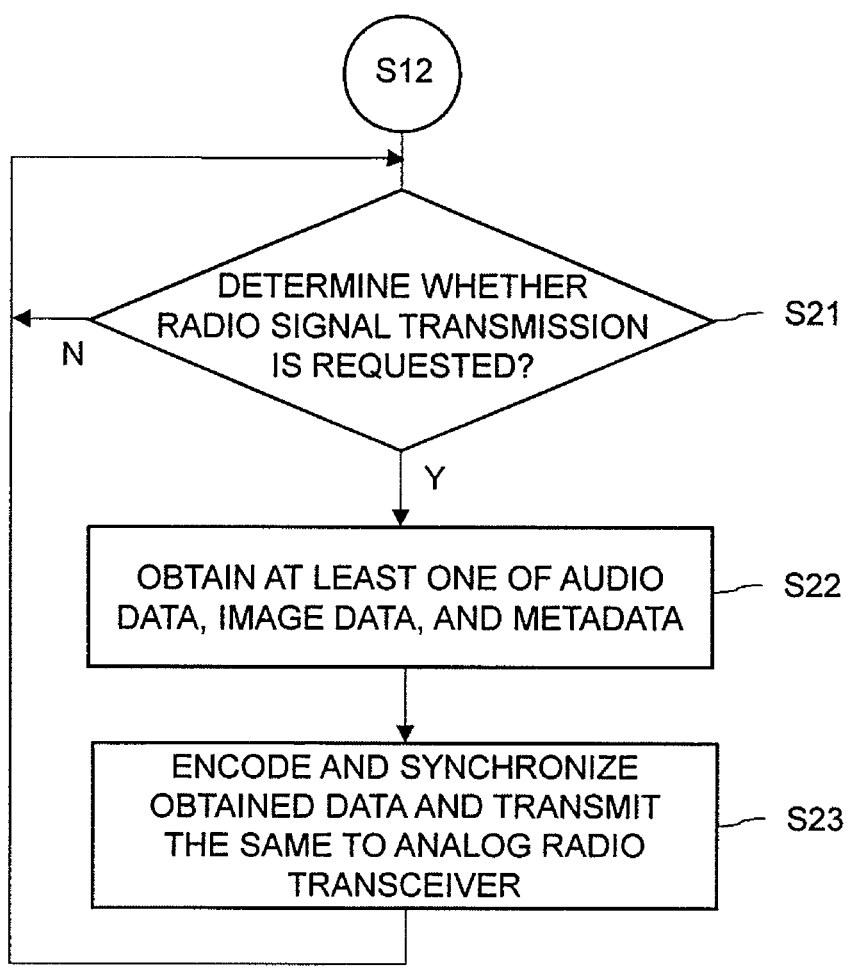

FIGS. 3 and 4 are diagrams for describing an operating method of a mobile terminal according to an embodiment of the present disclosure. FIG. 3 is a diagram for describing an operation of receiving a radio signal. FIG. 4 is a diagram for describing an operation of transmitting a radio signal.

First, an operation of receiving a radio signal will be described with reference to FIG. 3.

When the analog radio transceiver 100 is connected to the mobile terminal 200 through the audio cable 300 (S11), the main controller 250 of the mobile terminal 200 asks a user whether to execute the radio transceiver application 220 and then executes the radio transceiver application 220 (S12).

In this state, when another analog radio transceiver generates and transmits a radio signal, the analog radio transceiver 100 receives and demodulates the radio signal and outputs the demodulated signal to the mobile terminal 200 (S13).

An output signal of the analog radio transceiver 100 is connected to an M pole and a G pole of the audio plug 211 through the receiving high-pass filter 212, and is input to an audio line of the mobile terminal. The radio transceiver application 220 receives and decodes the output signal to reconstruct at least one of audio data, image data, and metadata included in the output signal of the analog radio transceiver 100 (S14).

The audio data reconstructed in operation S14 is reproduced through a speaker of the data input/output unit 240, and the reconstructed image data and metadata are reproduced through a touchscreen of the data input/output unit 240 (S15).

That is, according to the present disclosure, even additional information such as image data and metadata in addition to conversational voice provided through an existing analog radio transceiver may be additionally reproduced by using the speaker and the touchscreen provided in the mobile terminal 200.

An operation of transmitting a radio signal will now be described with reference to FIG. 4.

When a user manipulates a GUI of the radio transceiver application 220 or presses a PTT button of the analog radio transceiver to request radio signal transmission (S21), the radio transceiver application 220 obtains content to be transmitted by the user to the other party through the data input/output unit 240 in the form of at least one of audio data, image data, and metadata (S22).

In this case, the audio data may be at least one of the user's voice and a sound source file. The user's voice may be generated based on sound that is input in real time through a microphone of the mobile terminal, and the sound source file may be a file selected by the user from among sound source files pre-obtained and stored by the mobile terminal.

The image data may be any of photograph, text, an emoticon, etc., and may be obtained through a camera of the mobile terminal, may be obtained by searching for and selecting data pre-obtained and stored by the mobile terminal, or may be obtained by directly inputting (i.e., drawing) desired information through a data input menu of the GUI.

Finally, the metadata may be any of device information, time information, sender information, sender location information, etc., and may be automatically obtained through interoperation with the main controller 250 for managing and controlling an overall operation of the mobile terminal.

The data obtained in operation S12 is each encoded and synchronized, and then is output through an L pole and a G pole of the audio plug 211. The output signal is input to a microphone audio line of the analog radio transceiver 100 through the transmitting high-pass filter 213, and the analog radio transceiver 100 modules the signal into an RF signal and wirelessly transmits the modulated signal to another analog radio transceiver (S23).

Figure 5:
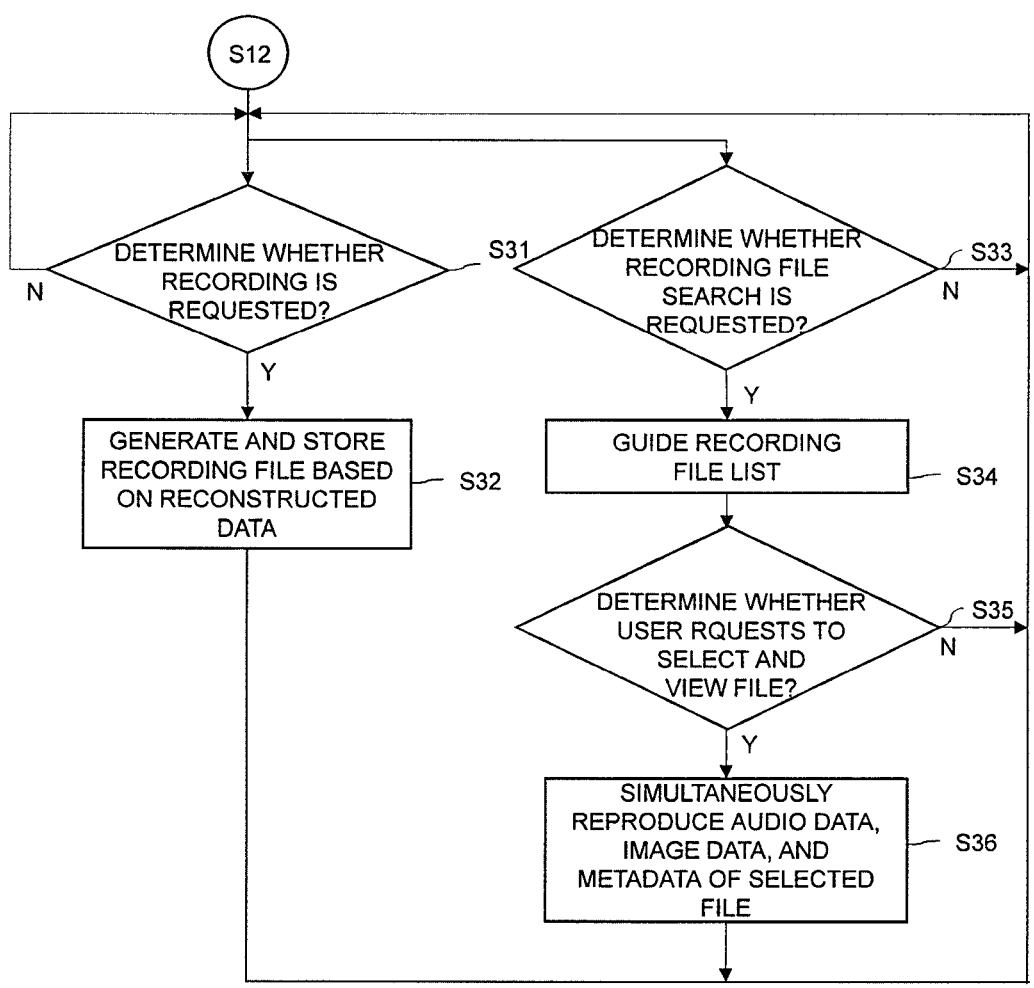

FIG. 5 is a diagram for describing an operating method of a mobile terminal according to another embodiment of the present disclosure, illustrating a radio content recording and searching operation.

As shown in FIG. 5, when a user requests radio content recording through the radio transceiver application 220 (S31), the radio transceiver application 220 records both data reconstructed through a decoding operation of operation S14 and data obtained through a data input/output unit of operation S22 in units of files and stores the data in the memory 230 (S32).

When the user requests recording file search (S33), a recording file list is configured and guided based on recording files stored in the memory 230 (S34).

When the user requests to select and view one file in the recording file list (S35), audio data, image data, and metadata corresponding to the selected file are read from the memory 230, audio-visualized, and then are simultaneously reproduced through the data input/output unit (S36).

The method according to the present embodiment may be embodied as a program executed in a computer and may be stored in a computer-readable recording medium, and examples of the computer-readable recording medium include read-only memories (ROMs), random-access memories (RAMs), compact disc (CD)-ROMs, magnetic tapes, floppy disks, optical data storage devices, and carrier waves (e.g., data transmission through the Internet).

The computer-readable recording medium may be distributed among computer systems that are interconnected through a network so that computer-readable code is stored and executed in a distributed fashion. Functional programs, code, and code segments for embodying the method may be easily derived by programmers in the technical field to which the present disclosure pertains.

In addition, although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims, and these modifications should not be individually understood from the technical spirit or the prospect of the present disclosure.

What is claimed is:

1. A digital radio system comprising:
    an analog radio transceiver configured to, while changing a used frequency band at any time, communicate with another analog radio transceiver through the used frequency band; and
    a mobile terminal configured to allow connection of the analog radio transceiver, and then decode a signal received through the analog radio transceiver and reconstruct and reproduce at least one of audio data, image data, and metadata, or encode at least one audio data, image data, and metadata generated by a user and wirelessly transmit the encoded data through the analog radio transceiver,
    wherein the mobile terminal comprises:
        an external device connector configured to support connection and communication of the analog radio transceiver;
        a data input/output unit comprising at least one of a touchscreen, a speaker, a microphone, and a camera; and
        a radio transceiver application configured to decode an output signal of the analog radio transceiver, reconstruct the output signal into at least one of audio data, image data, and metadata, and then reproduce the reconstructed data through the data input/output unit, or encode at least one of audio data, image data, and metadata obtained through the data input/output unit and then transmit the encoded data to the analog radio transceiver through the external device connector,
    wherein the radio transceiver application comprises:
        an input buffer configured to sequentially store output signals of the analog radio transceiver and then sequentially output the stored signals in units of frames;
        a decoder configured to decode an output signal of the input buffer;
        an encoder configured to encode at least one of audio data, image data, and metadata obtained through the data input/output unit;

an output buffer configured to sequentially store output signals of the encoder and then sequentially output the stored signals to the external device connector in units of frames; and a controller configured to configure and provide a graphical user interface (GUI), and control an overall application operation according to a user control value input through the GUI.

2. The digital radio system of claim 1, wherein the controller further comprises, when radio content recording is requested, a function of recording both data reconstructed through the decoder and data input to the encoder in units of files and storing the data in a memory.

3. The digital radio system of claim 2, wherein the controller further comprises, when recording file search is requested, a function of guiding recording files stored in the memory, and then reading audio data, image data, and metadata of a user-selected file and reproducing the read data audiovisually through the data input/output unit.

4. The digital radio system of claim 1, wherein the controller further comprises a function of providing an emergency menu through the GUI, and when the emergency menu is selected by the user, occupying a used frequency in preference to another analog radio transceiver.

5. The digital radio system of claim 1, wherein the controller further comprises a function of pre-defining a user motion gesture corresponding to an emergency event while interoperating with a motion sensor built in the mobile terminal, and when a mobile terminal motion sensed through the motion sensor corresponds to the user motion gesture, occupying a used frequency in preference to another analog radio transceiver.

* * * * *